(12) United States Patent
Schulz et al.

(10) Patent No.: US 7,775,579 B2
(45) Date of Patent: Aug. 17, 2010

(54) TOP DRIVE FOR A FLEXIBLE VEHICLE ROOF

(75) Inventors: Lars Schulz, Schöneiche (DE); Felix Hermann, Leonberg (DE); Dominik Beierl, Korntal-Münchingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 444 days.

(21) Appl. No.: 11/852,526

(22) Filed: Sep. 10, 2007

(65) Prior Publication Data

US 2008/0061588 A1 Mar. 13, 2008

(30) Foreign Application Priority Data

Sep. 8, 2006 (DE) ................. 10 2006 042 202

(51) Int. Cl.
*B60J 7/08* (2006.01)
(52) U.S. Cl. ................................. 296/107.01
(58) Field of Classification Search ............ 296/107.01, 296/108, 111, 112, 116, 117, 107.16
See application file for complete search history.

(56) References Cited

U.S. PATENT DOCUMENTS

| 2,617,681 | A | 11/1952 | Hawver et al. | |
|---|---|---|---|---|
| 6,536,830 | B1 | 3/2003 | Mayer et al. | |
| 2003/0052507 | A1* | 3/2003 | Obendiek et al. | 296/107.01 |
| 2003/0146642 | A1 | 8/2003 | Mandl et al. | |
| 2004/0094987 | A1* | 5/2004 | Salz et al. | 296/107.01 |
| 2006/0131918 | A1* | 6/2006 | Queveau et al. | 296/107.01 |
| 2007/0138826 | A1* | 6/2007 | Papendorf et al. | 296/107.01 |

FOREIGN PATENT DOCUMENTS

| DE | 889 270 | 9/1953 |
|---|---|---|
| DE | 44 38 925 C1 | 11/1995 |
| WO | 0243978 A2 | 6/2002 |

OTHER PUBLICATIONS

European Search Report dated Feb. 12, 2010.

\* cited by examiner

*Primary Examiner*—Hilary Gutman

(57) ABSTRACT

A top drive for a flexible vehicle roof which can be transferred from a closed position into a storage position and vice versa. At least one roof link is movable via a linear drive, the roof link and a fixed end of the linear drive being fastened to a main bearing of the top, wherein an actuating end of the linear drive is fastened pivotably to a throw-over lever which is fastened to the main bearing of the top and at the free end of which there is arranged a drive connecting rod which is fastened at a first end in an articulated manner to the free end of the throw-over lever and at a second end in an articulated manner to a section of the roof link, which section is spaced apart from the pivot point on the main bearing of the top, as a result of which a driving movement of the linear drive can be transmitted to the roof link.

15 Claims, 2 Drawing Sheets

TOP DRIVE FOR A FLEXIBLE VEHICLE ROOF

CROSS-REFERENCE TO RELATED APPLICATION

This application claims the priority, under 35 U.S.C. §119, of German application DE 10 2006 042 202.3, filed Sep. 8, 2006; the prior application is herewith incorporated by reference in its entirety.

BACKGROUND OF THE INVENTION

Field of the Invention

The invention relates to a drive for the top of a flexible vehicle roof of a convertible. The top is movable from a closed position into a storage position and vice versa. At least one roof link is movable via a linear drive. The roof link and a fixed end of the linear drive are fastened to a main bearing of the top.

A flexible vehicle roof known from the commonly assigned German patent publication DE 44 38 925, and its counterpart U.S. Pat. No. 6,536,830 B1, has a plurality of roof links, with one roof link being movable via a linear drive. The roof link and a fixed end of the linear drive are fastened to a main bearing of the top.

U.S. Pat. No. 2,617,681 and its German counterpart patent DE 88 92 70 likewise disclose a folding top for motor vehicles, in which a movable roof link can be opened and closed via a cylinder with a piston rod. That prior art device is relatively complicated and has a plurality of drive elements, which protrude far beyond the region of a main bearing of the top, for the flexible roof.

BRIEF SUMMARY OF THE INVENTION

It is accordingly an object of the invention to provide a drive for a roof top which overcomes the above-mentioned disadvantages of the heretofore-known devices and methods of this general type and which is improved such that the elements of the top drive together with the main bearing of the top and further elements articulated thereon, in particular roof links, form a compact unit which can be installed connected together, with the drive parts of the top being limited in their spatial extent substantially to the extent of the main bearing of the top.

With the foregoing and other objects in view there is provided, in accordance with the invention, a top drive for a flexible vehicle roof movably disposed between a closed position and a storage position. The assembly comprises:
 a main bearing;
 at least one roof link pivotally fastened to the main bearing at a pivot point;
 a linear drive for moving the at least one roof link, the linear drive having a fixed end fastened to the main bearing and an actuating end;
 a throw-over lever fastened to the main bearing, the throw-over lever having the actuating end of the linear drive pivotally fastened thereto;
 a drive connecting rod having a first end articulated at a free end of the throw-over lever and a second end articulated at a section of the roof link spaced from the pivot point on the main bearing, for transmitting a driving movement of the linear drive to the roof link.

In other words, the objects of the invention are achieved in that an actuating end of the linear drive is fastened pivotably to a throw-over lever which is fastened to the main bearing of the top and at the free end of which there is arranged a drive connecting rod which is fastened at a first end in an articulated manner to the free end of the throw-over lever and at a second end in an articulated manner to a section of the roof link, which section is spaced apart from the pivot point on the main bearing of the top, as a result of which a driving movement of the linear drive can be transmitted to the roof link. The essence of the invention is considered, as it were, a driving force transmission chain which is integrated in the region of the main bearing of the top and fastened thereto and comprises the linear drive, the drive connecting rod and the throw-over lever. These parts move essentially in the region of the main bearing of the top, and therefore the top drive as a whole is of space-saving design. An advantageous effect also achieved with regard to the installation of the top and, in particular, the installation of the drive parts is that the top or at least parts thereof can be inserted into a vehicle body in preassembled form, for which purpose only a few screws are required which secure the bearing of the top on the vehicle body. Separate supporting of the linear drive, in particular of a drive cylinder, is not required. The power of the linear drive is introduced into the members of the drive chain between linear drive and roof link first of all in a direction, which points away from the roof link, of a throw-over lever which can be pivoted within the main bearing of the top. The drive connecting rod is located at the free pivoting end of the lever and transmits the pivoting movement of the throw-over lever to the roof link which is fastened to the main bearing of the top. With just a few drive parts, a transmission chain is therefore provided which is space saving in comparison to the elements which project to a relatively great extent in the prior art.

In a preferred embodiment, the actuating end of the linear drive acts approximately centrally on the throw-over lever, and therefore the stroke of the linear drive is transmitted with respect to the free end of the throw-over lever. At this free end, the drive connecting rod is provided for transmitting the movement, the drive connecting rod acting on the roof link in such a manner that the latter can be pivoted from a closed position of the top into an open position of the top and vice versa. The stroke transmission by means of the throw-over lever integrated into the main bearing of the top permits a relatively short design of the linear drive for relatively large strokes transmitted to the roof link. The roof link, at its end facing the main bearing, has a shape which essentially forms a knee region, with the drive connecting rod being mounted rotatably in the knee region of the roof link.

In accordance with an added feature of the invention, a longitudinal axis of the linear drive and a longitudinal axis of the drive connecting rod do not run parallel to each other in any movement phase of the top drive.

In accordance with an additional feature of the invention, a longitudinal axis of the linear drive and a substantial direction of longitudinal extent of a limb of the roof link extending from a knee region thereof to the roof segments of the top are disposed substantially parallel to each other.

In accordance with another feature of the invention, the throw-over lever passes substantially through an angular range of less than 90° during a movement of the top drive.

In accordance with again an added feature of the invention, the vehicle top is mounted on the main bearing via the roof link and a supporting link, and the top drive acts exclusively on the roof link.

In accordance with again an additional feature of the invention, the throw-over lever, the drive connecting rod, the linear drive, the roof link, and the supporting link together with the main bearing form a constructional unit that can be fitted into a vehicle body connected together.

In accordance with again another feature of the invention, the main bearing is formed with a substantially U-shaped opening with an inner region configured to receive at least a part of a knee region of the roof link in the storage position of the top.

In accordance with again a further feature of the invention, the throw-over lever is formed with a stop that acts upon the drive connecting rod in the storage position of the top.

In accordance with a concomitant feature of the invention, the throw-over lever and the drive connecting rod together take up a substantially extended position in the closed position of the top.

Other features which are considered as characteristic for the invention are set forth in the appended claims.

Although the invention is illustrated and described herein as embodied in top drive, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
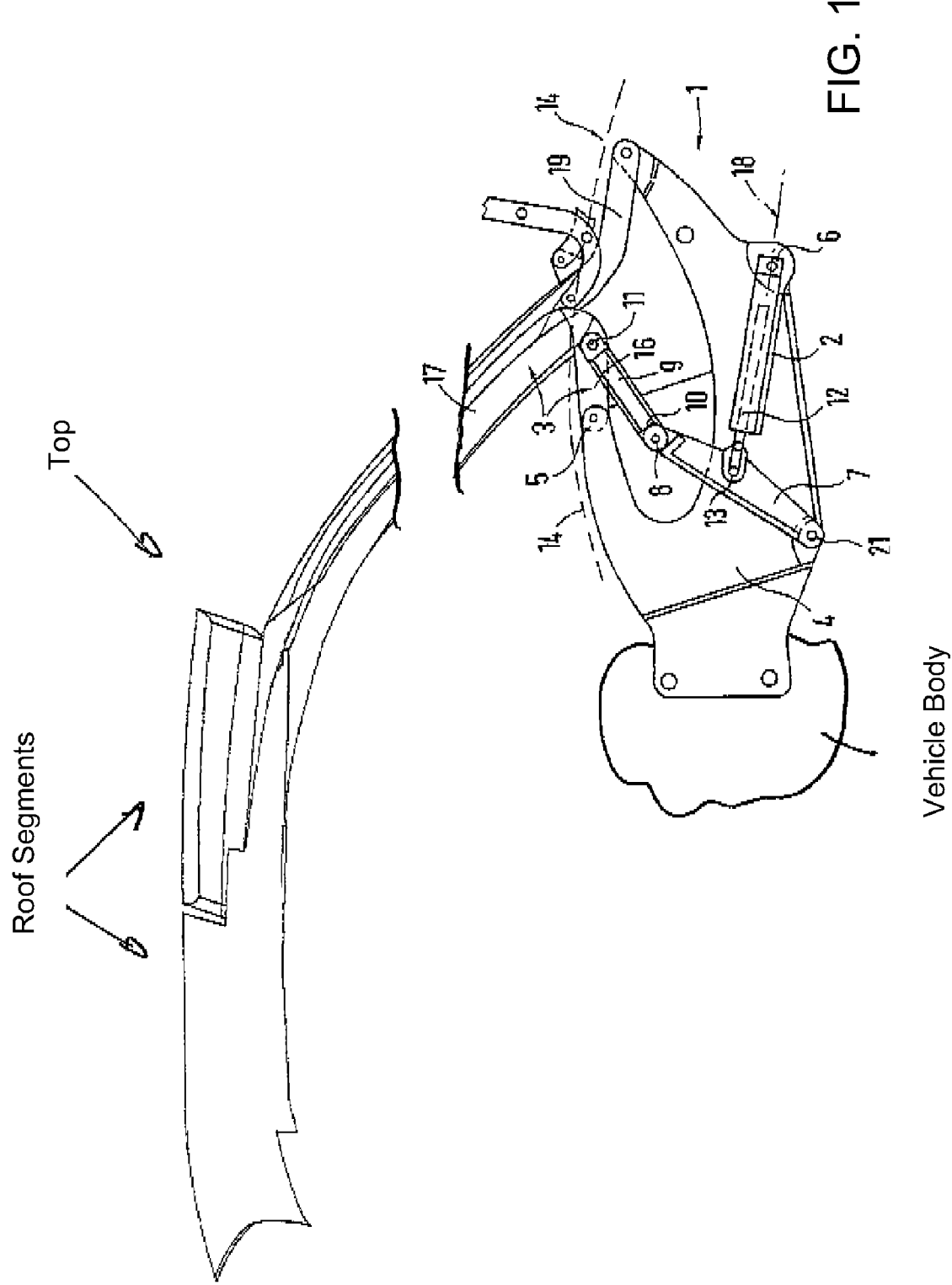
FIG. 1 is a schematic view of the primarily important elements of a top drive with roof links moved by it, in a first position corresponding to a closed position of the roof.

Referring now to the figures of the drawing in detail and first, particularly, to FIG. 1 thereof, a top drive 1 and the vehicle roof that is moved by the top drive 1 comprise a linear drive 2, a roof link 3 moved by the linear drive 2, and a main bearing 4 of the top, to which a fixed end 5 of the roof link 3 and a fixed end 6 of the linear drive 2 are fastened. Furthermore, a throw-over lever 7 is provided which is fastened pivotably to the main bearing 4 of the top and at the free end 8 of which there is arranged a drive connecting rod 9 which is fastened at a first end 10 to the free end 8 of the throw-over lever 7 and acts at a second end 11 on the roof link 3. In the exemplary embodiment illustrated here, the linear drive 2 has a linearly displaceable rod 12, for example a piston rod, the free actuating end 13 of which acts approximately centrally on the throw-over lever 7 and, as a result, leads approximately to a doubling of the movement with respect to the free end 8 of the throw-over lever 7. As a result, the movement clearance required by the linear drive 2 and by the throw-over lever 7 is limited.

None of the drive elements linear drive 2, throw-over lever 7 and drive connecting rod 9 protrude substantially beyond an upper outer contour 14 of the main bearing 4 of the top, which is illustrated by dashed lines in FIG. 1, in any movement phase of the top drive 1. The dashed outer contour 14, firstly, follows the upper edges of the main bearing 4 of the top and, secondly, runs between the bearing point at the fixed end of the roof link 3 and the bearing point at the fixed end of the supporting link 19.

The roof link 3, at its end facing the main bearing 4 of the top, has a shape which essentially forms a knee region 15, with the drive connecting rod 9 being mounted rotatably on the roof link 3 in the knee region 15 thereof, and the two limbs 16, 17 which are adjacent to the knee region 15 enclosing an acute angle.

A longitudinal axis 18 of the linear drive 2 and a longitudinal axis of the drive connecting rod 9 do not run parallel to each other in any movement phase of the top drive 1, but rather the two elements enclose an acute angle in all movement phases. The throw-over lever 7 passes substantially through an angular range of less than 90° during the movement phase of the top drive 1.

In addition to the roof link 3, the vehicle top is additionally also mounted on the main bearing 4 of the top by a supporting link 19, but the top drive 1 acts exclusively on the roof link 3 and, via the latter, moves all of the other roof parts under positive control.

The throw-over lever 7, the drive connecting rod 9, the linear drive 2, the roof link 3 and the supporting link 19 together with the main bearing 4 of the top form a constructional unit which can be installed connected together, i.e., in a preassembled state, into a vehicle body. Since further roof parts are fastened to or are preassembled on the roof link 3 and the supporting link 19, the entire vehicle roof including the motorized drive can be fitted in a simple manner into a vehicle body.

Figure 3:
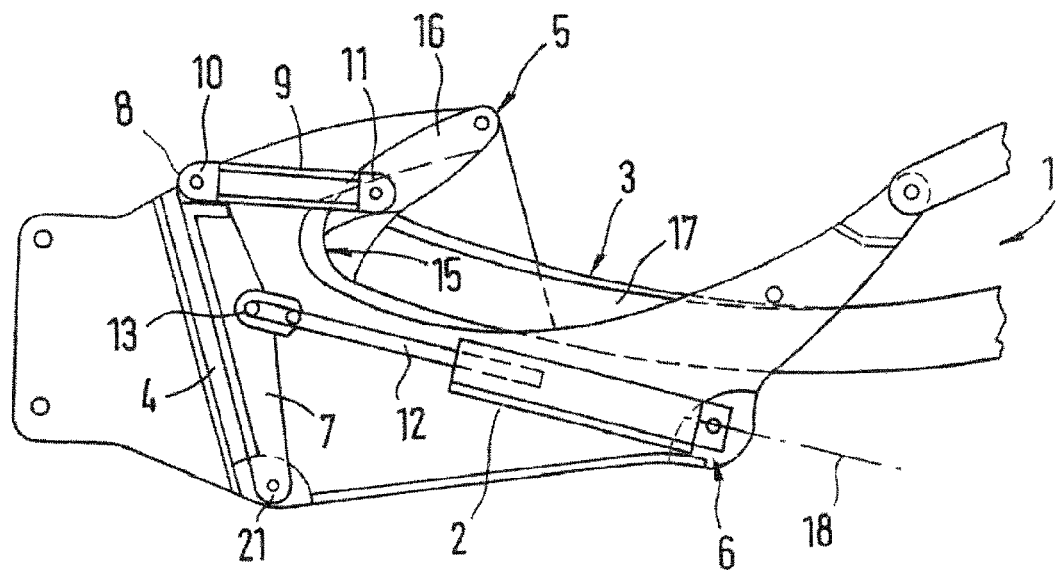
FIG. 3 is a similar view showing the elements according to FIGS. 1 and 2 in a position corresponding to an open position of the roof.

The main bearing 4 of the top is of essentially U-shaped design and, in the storage position of the top according to FIG. 3, at least some regions of the knee region 15 of the roof link 3 dip into the inner region.

Figure 2:
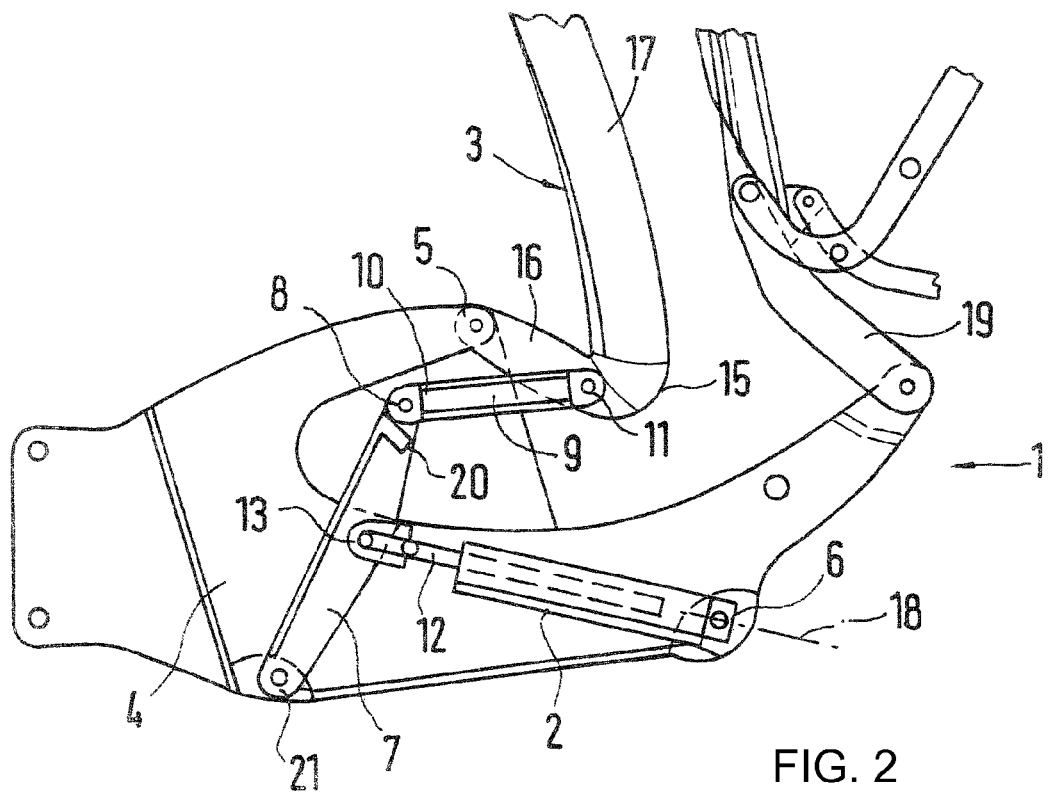
FIG. 2 is a similar view of the elements shown in FIG. 1, in a second position corresponding to the roof being half open.

It is also apparent from drawing FIGS. 1 to 3 that the throw-over lever 7 has a stop 20 which acts upon and supports the drive connecting rod 9 in the storage position of the top, as it is illustrated in FIG. 3. In addition, it is apparent from FIG. 1 that, in the closed position of the top, the throw-over lever 7 together with the drive connecting rod 9 takes up a substantially extended supporting position, as a result of which forces introduced via the roof link 3 are directly supported on the pivot bearing 21 between the throw-over lever 7 and the main bearing 4 of the top.

The invention claimed is:

1. A top drive for a flexible vehicle roof movably disposed between a closed position and a storage position, comprising:
   a main bearing defining an upper contour;
   at least one roof link pivotally fastened to said main bearing at a pivot point;
   a linear drive for moving said at least one roof link, said linear drive having a fixed end fastened to said main bearing and an actuating end;
   a throw-over lever fastened to said main bearing, said throw-over lever having said actuating end of said linear drive pivotally fastened thereto;
   a drive connecting rod having a first end articulated at a free end of said throw-over lever and a second end articulated at a section of said roof link spaced from said pivot point on said main bearing, for transmitting a driving movement of said linear drive to said roof link;
   wherein neither of said linear drive, said throw-over lever, and said drive connecting rod protrudes substantially beyond said upper contour of said main bearing in a movement phase of the top drive.

2. The top drive according to claim 1, wherein said actuating end of said linear drive is connected to act substantially centrally on said throw-over lever.

3. The top drive according to claim 1, wherein said roof link, at an end facing said main bearing, substantially has a shape of a knee region.

4. The top drive according to claim 3, wherein said drive connecting rod is rotatably mounted to said knee region of said roof link, and said roof link has two limbs adjacent said knee region and enclosing an acute angle.

5. The top drive according to claim 3, wherein said drive connecting rod is connected to act between said knee region of said roof link and a limb end pivotably mounted to said main bearing.

6. The top drive according to claim 1, wherein a longitudinal axis of said linear drive and a longitudinal axis of said drive connecting rod do not run parallel to each other in any movement phase of the top drive.

7. The top drive according to claim 1, wherein the vehicle roof is formed with roof segments and wherein a longitudinal axis of said linear drive and a substantial direction of longitudinal extent of a limb of said roof link extending from a knee region thereof to the roof segments are disposed substantially parallel to each other.

8. The top drive according to claim 1, wherein said throw-over lever passes substantially through an angular range of less than 90° during a movement of the top drive.

9. The top drive according to claim 1, wherein the vehicle roof is mounted on said main bearing via said roof link and a supporting link, and the top drive acts exclusively on said roof link.

10. The top drive according to claim 9, wherein said throw-over lever, said drive connecting rod, said linear drive, said roof link, and said supporting link together with said main bearing form a constructional unit that can be fitted into a vehicle body connected together.

11. The top drive according to claim 1, wherein said main bearing is formed with a substantially U-shaped opening with an inner region configured to receive at least a part of a knee region of said roof link in a storage position of the vehicle roof.

12. The top drive according to claim 1, wherein said throw-over lever is formed with a stop configured to act upon said drive connecting rod in a storage position of the vehicle roof.

13. The top drive according to claim 1, wherein said throw-over lever and said drive connecting rod together take up a substantially extended position in a closed position of the vehicle roof.

14. A top drive for a flexible vehicle roof movably disposed between a closed position and a storage position, comprising:
a main bearing;
at least one roof link pivotally fastened to said main bearing at a pivot point;
a linear drive for moving said at least one roof link, said linear drive having a fixed end fastened to said main bearing and an actuating end;
a throw-over lever fastened to said main bearing, said throw-over lever having said actuating end of said linear drive pivotally fastened thereto;
a drive connecting rod having a first end articulated at a free end of said throw-over lever and a second end articulated at a section of said roof link spaced from said pivot point on said main bearing, for transmitting a driving movement of said linear drive to said roof link; and
wherein said main bearing is formed with a substantially U-shaped opening with an inner region configured to receive at least a part of a knee region of said roof link in a storage position of the vehicle roof.

15. A top drive for a flexible vehicle roof movably disposed between a closed position and a storage position, comprising:
a main bearing;
at least one roof link pivotally fastened to said main bearing at a pivot point;
a linear drive for moving said at least one roof link, said linear drive having a fixed end fastened to said main bearing and an actuating end;
a throw-over lever fastened to said main bearing, said throw-over lever having said actuating end of said linear drive pivotally fastened thereto;
a drive connecting rod having a first end articulated at a free end of said throw-over lever and a second end articulated at a section of said roof link spaced from said pivot point on said main bearing, for transmitting a driving movement of said linear drive to said roof link; and
wherein said throw-over lever is formed with a stop configured to act upon said drive connecting rod in a storage position of the vehicle roof.

* * * * *